US012590987B2

(12) United States Patent
Sorenson et al.

(10) Patent No.: US 12,590,987 B2
(45) Date of Patent: Mar. 31, 2026

(54) GENERATING A VIRTUAL SENSOR SIGNAL FROM A PLURALITY OF REAL SENSOR SIGNALS

(71) Applicant: HRL Laboratories, LLC, Malibu, CA (US)

(72) Inventors: Logan D. Sorenson, Thousand Oaks, CA (US); Patrick J. Webb, Sacramento, CA (US); Matthew J. Pelliccione, Santa Monica, CA (US); David T. Chang, Calabasas, CA (US); Raviv Perahia, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 396 days.

(21) Appl. No.: 18/194,092

(22) Filed: Mar. 31, 2023

(65) Prior Publication Data

US 2024/0329078 A1 Oct. 3, 2024

(51) Int. Cl.
*G01P 21/00* (2006.01)
(52) U.S. Cl.
CPC .................................... *G01P 21/00* (2013.01)

(58) Field of Classification Search
None
See application file for complete search history.

(56) References Cited

U.S. PATENT DOCUMENTS

| | | | |
|---|---|---|---|
| 8,100,010 B2 | 1/2012 | Fly et al. | |
| 9,696,340 B2 | 7/2017 | Trusov et al. | |
| 2013/0024013 A1* | 1/2013 | Mullin | G05B 19/0428 |
| | | | 700/28 |

FOREIGN PATENT DOCUMENTS

| | | | | |
|---|---|---|---|---|
| CN | 115236135 A | * | 10/2022 | ............. G01N 27/04 |
| WO | WO-8501347 A1 | * | 3/1985 | ......... G05B 19/4063 |
| WO | WO-2021028322 A1 | * | 2/2021 | ............. G06N 3/047 |

* cited by examiner

*Primary Examiner* — Matthew G Marini
(74) *Attorney, Agent, or Firm* — Wheatstone IP Law Corporation; Milad G. Shara

(57) ABSTRACT

A computer system comprising N real sensors for generating N real sensor signals, and a multiplexer for selecting M of the real sensor signals from the N of real sensor signals, where M is less than N. The computer system further comprises a combiner for combining the M real sensor signals to generate a virtual sensor signal representing an output of one of the unselected N real sensors.

13 Claims, 7 Drawing Sheets

GENERATING A VIRTUAL SENSOR SIGNAL FROM A PLURALITY OF REAL SENSOR SIGNALS

TECHNICAL FIELD

This specification is related to the generation of sensor signals.

BACKGROUND

Conventional geometric structures for mounting sensor clusters are simple cubes which provide six degrees of freedom (6DOF). The cube structure allows for two sensors to be along each of the three Cartesian axes, for example, an accelerometer and a gyroscope on parallel faces or sharing a single face. In operation of the sensor cluster, the sensors often have some amount of error that worsens over time or under specific environmental conditions.

DETAILED DESCRIPTION

Figures 2A, 2B, 2C, 2D:
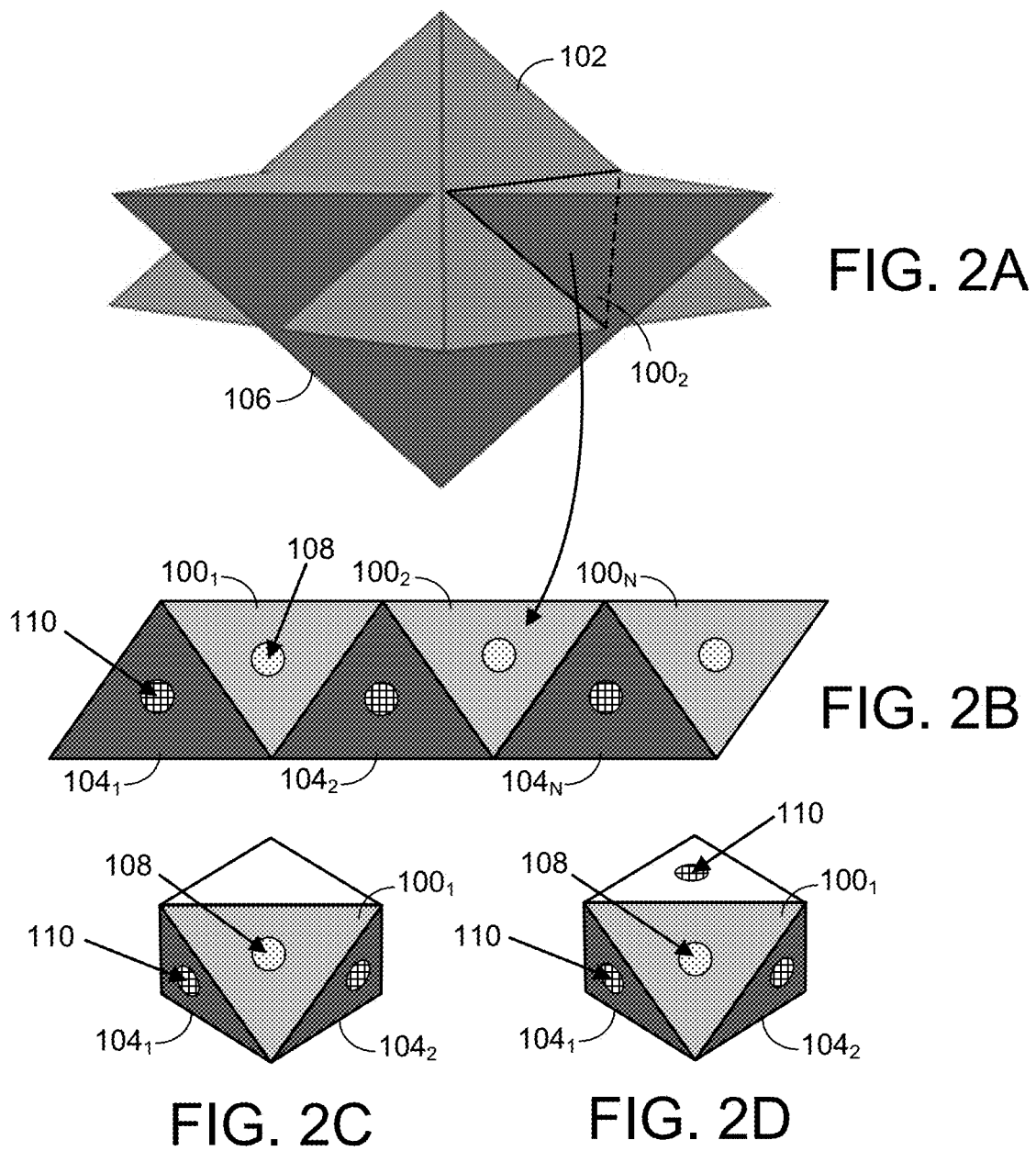
FIG. 2A shows a first tetrahedron structure intersecting with a second, inverted tetrahedron structure to form a double tetrahedron sensor cluster base according to an embodiment.
FIG. 2B shows how in one embodiment the sides of the intersecting tetrahedrons form interleaved side surfaces (when unwrapped into a 2D representation), wherein a first type of sensor is mounted on a first interleave of side surfaces and a second type of sensor is mounted on a second interleave of the side surfaces.
FIG. 2C shows the interleaved side surfaces wrapped into the 3D representation to form the sensor cluster base.
FIG. 2D shows an embodiment wherein the sensor cluster base comprises a top surface and a bottom surface, wherein the second type of sensor is mounted on the top surface and the first type of sensor is mounted on the bottom surface.

FIGS. 2A-2C show a sensor cluster according to an embodiment comprising a first plurality of side surfaces $100_1$-$100_N$ of a first N-hedron structure (a first tetrahedron structure 102 in this embodiment), and a second plurality of side surfaces $104_1$-$104_N$ of a second N-hedron structure (a second tetrahedron structure 106). A first plurality of a first type of sensor 108 are mounted on the first plurality of side surfaces $100_1$-$100_N$, and a second plurality of a second type of sensor 110 are mounted on the second plurality of side surfaces $104_1$-$104_N$. N is greater than three and the first plurality of side surfaces $100_1$-$100_N$ are interleaved with the second plurality of side surfaces $104_1$-$104_N$.

Figure 1A:
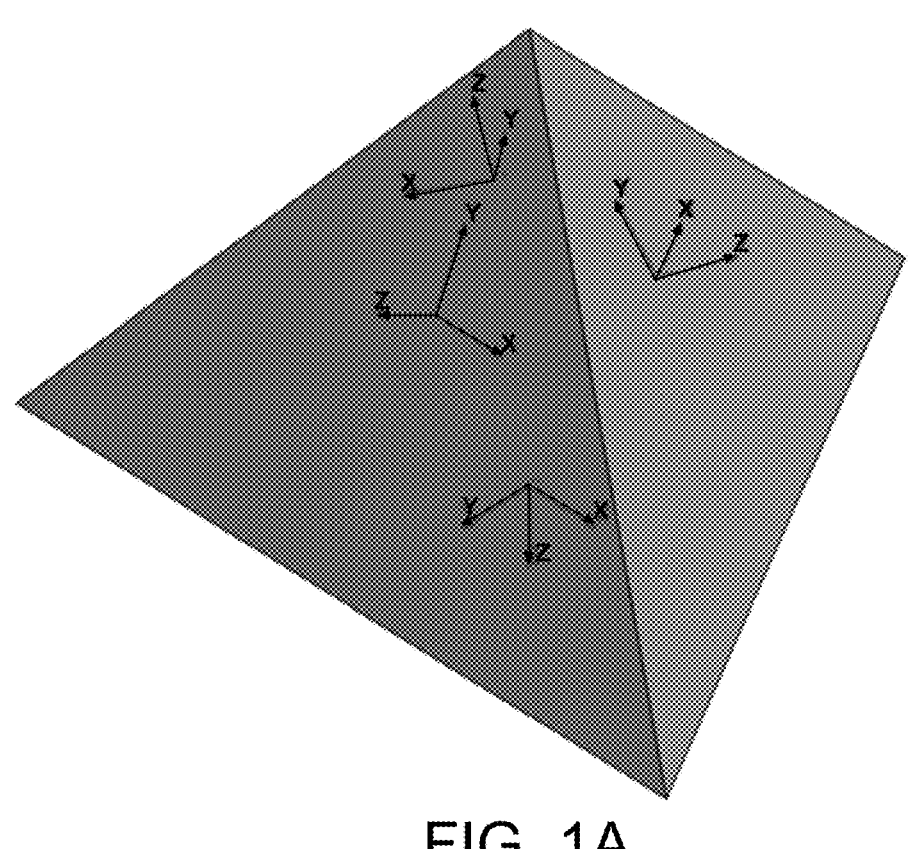
FIGS. 1A and 1B show a N-hedron structure in the form of a tetrahedron (four surfaces) with corresponding z vectors normal to each surface.
Figure 1B:
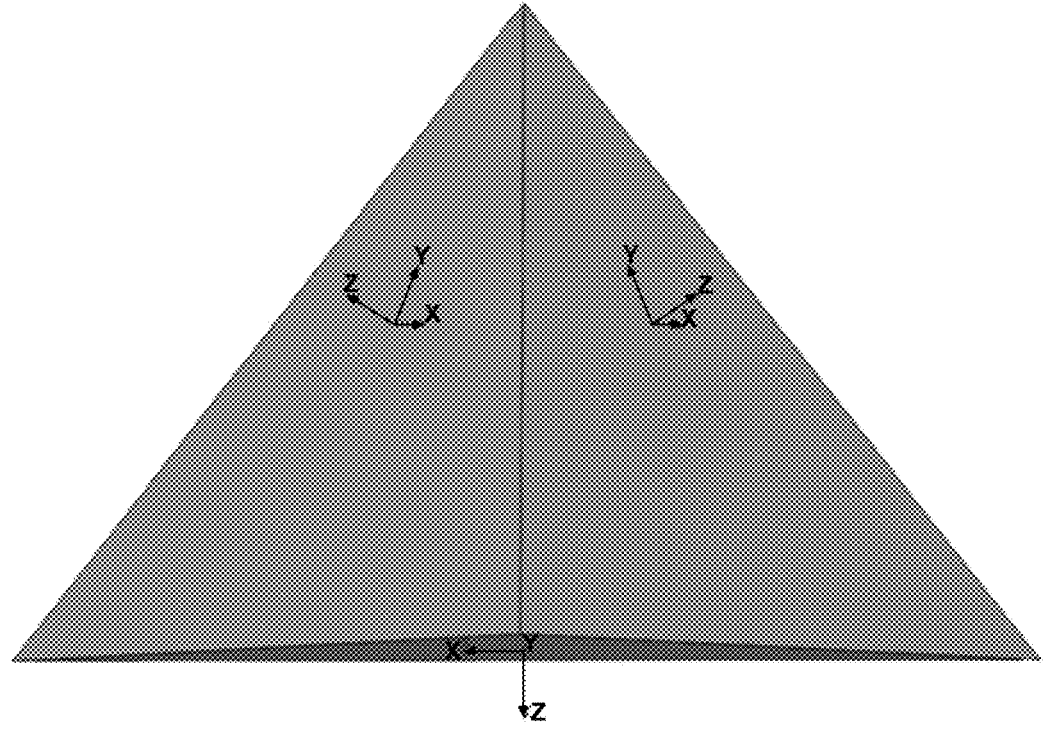

FIGS. 1A and 1B show a N-hedron structure in the form of a tetrahedron (four surfaces) with corresponding z vectors normal to each surface. When a sensor is mounted on each of the four surfaces, each sensor is affected by the corresponding z vector in a configuration that provides four degrees of freedom (4DOF). FIG. 2A shows a first tetrahedron structure intersecting with a second, inverted tetrahedron structure 106 to form a double tetrahedron sensor cluster base such as shown in FIG. 2C according to an embodiment. This embodiment provides eight degrees of freedom (8DOF) in an efficient, space saving form factor. This embodiment also provides redundancy that enables a subset of the sensors to generate a virtual sensor signal that may be used to replace a defective sensor, and/or to calibrate the sensors in the sensor cluster.

Referring again to the embodiment of FIG. 2B, any suitable first type of sensor 108 may be mounted on each of the first plurality of side surfaces $100_1$-$100_N$, such as a gyroscope, and any suitable second type of sensor 110 may be mounted on each of the second plurality of side surfaces $104_1$-$104_N$, such as an accelerometer. In the embodiment of FIG. 2C, the sensor cluster base may or may not include a top surface or a bottom surface, and in an embodiment of FIG. 2D the sensor cluster base comprises a top surface for mounting one of the second sensor type 110 and a bottom surface (not shown) for mounting one of the first sensor type 108. Although the embodiments described herein show a single sensor mounted on a surface of the sensor cluster base, in other embodiments zero or multiple sensors may be mounted on one or more surfaces of the sensor cluster base.

Figures 3A, 3B, 3C, 3D:
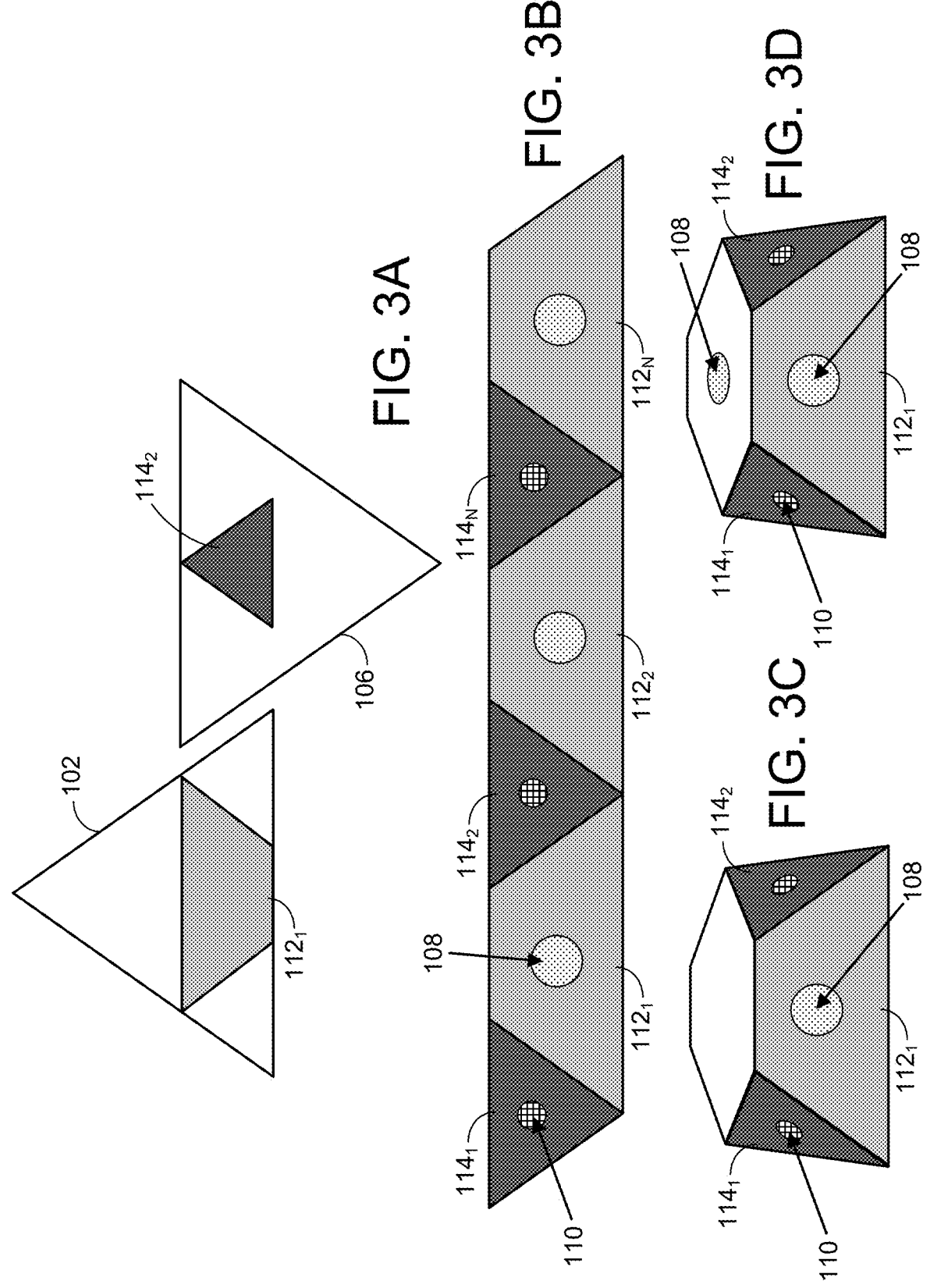
FIG. 3A shows an embodiment wherein the double tetrahedron sensor cluster base is formed by the intersection of two tetrahedron structures (one inverted) such that their corresponding centroids are offset, thereby forming different size side surfaces for each interleave.
FIG. 3B shows the different size side surface for each interleave which facilitates different size sensor types according to an embodiment.
FIG. 3C shows the different size interleaved side surfaces wrapped into the 3D representation to form the sensor cluster base.
FIG. 3D shows an embodiment wherein the sensor cluster base comprises a top surface and a bottom surface, wherein the first type of sensor is mounted on the top surface and the second type of sensor is mounted on the bottom surface.

In one embodiment, the footprint of the first type of sensor 108 may be larger than the footprint of the second type of sensor 110. Accordingly in one embodiment shown in FIGS. 3A-3D, to accommodate different size sensor types the sensor cluster base is formed from the intersection of the two tetrahedrons having offset centroids (by effectively "pushing" the two tetrahedrons 102 and 106 of FIG. 2A closer together) which results in each of the interleaved side surfaces having different relative sizes to accommodate the two different size sensor types. FIG. 3A shows the resulting side surfaces (e.g., 112$_1$ and 114$_2$) that are formed from the intersecting tetrahedrons 102 and 106, and FIG. 3B shows the interleaved sides (unwrapped) which for clarity are inverted relative to FIG. 3A (i.e., the entire sensor cluster base is inverted in FIG. 3B relative to FIG. 3A). FIG. 3B shows that in this embodiment the size of each of the first plurality of side surfaces 112$_1$-112$_N$ is larger than the size of each of the second plurality of side surfaces 114$_1$-114$_N$, thereby accommodating a first sensor type 108 having a larger footprint than a second sensor type 110. In the embodiment of FIG. 3C, the sensor cluster base may or may not include a top surface or a bottom surface, and in an embodiment of FIG. 3D, the sensor cluster base comprises a top surface for mounting one of the first sensor type 108 and a bottom surface (not shown) for mounting one of the second sensor type 110.

Figures 4A, 4B:
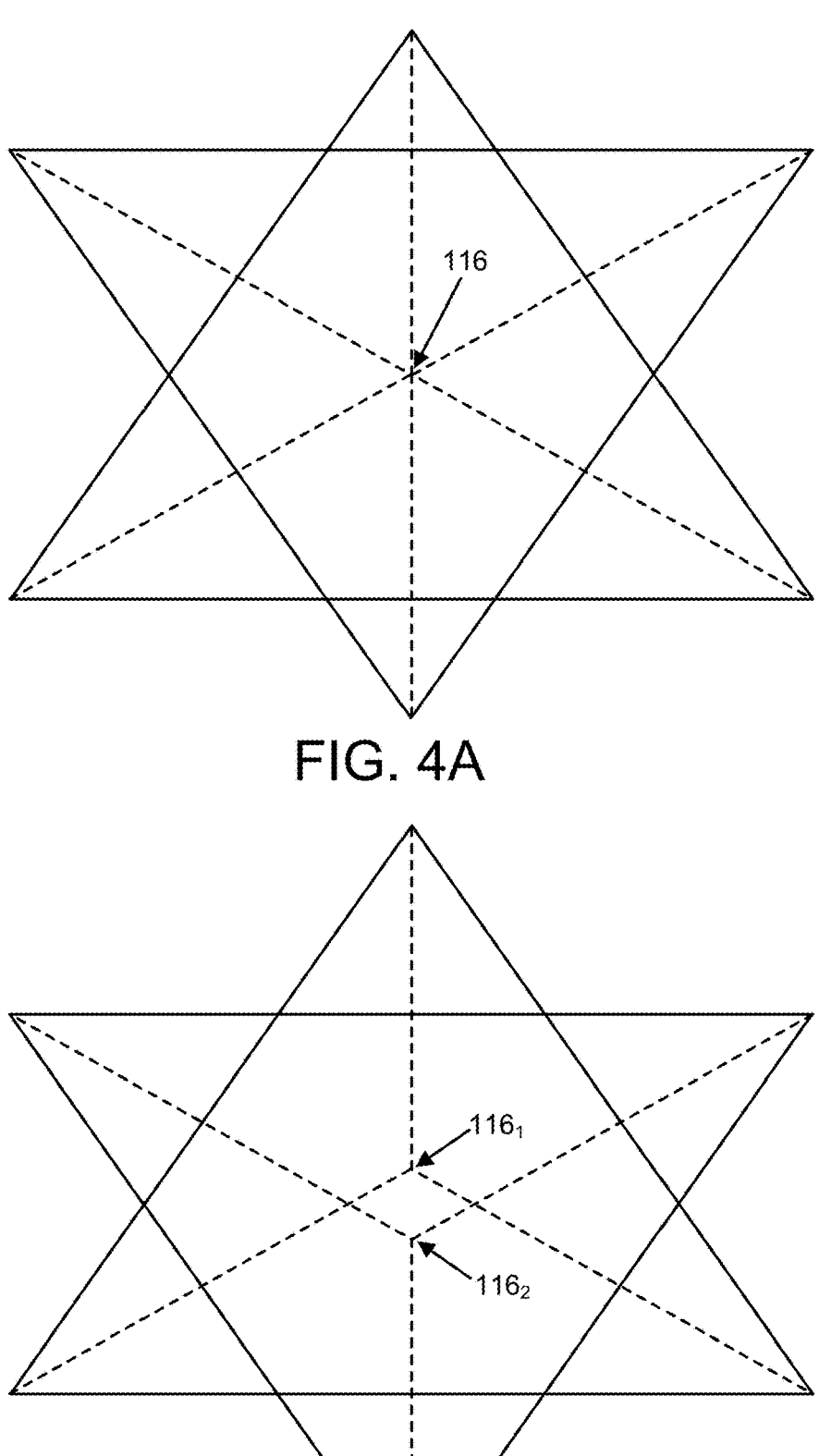
FIG. 4A shows an embodiment wherein the intersecting tetrahedron structures have a common centroid (e.g., forming the sensor cluster base shown in FIG. 2C).
FIG. 4B shows an embodiment wherein the intersecting tetrahedron structures have centroids which are offset (e.g., forming the sensor cluster base shown in FIG. 3C).

FIG. 4A shows intersecting tetrahedron structures corresponding to FIG. 2A having a common centroid 116 resulting in equal size, interleaved side surfaces such as shown in FIG. 2B. When the tetrahedrons are "pushed" closer together as shown in FIG. 4B in order to generate a sensor cluster base having different sized interleaved side surfaces such as shown in FIG. 3B, the centroids 116$_1$ and 116$_2$ of the respective tetrahedrons are offset from one another. In one embodiment, this offset of centroids creates an offset in the two cartesian spaces covered by each tetrahedron structure, and a corresponding offset between the sensor signals of the two subset of sensor types. Accordingly in one embodiment, the second plurality of sensor signals are transformed to compensate for an offset of a second centroid of the second plurality of sensors from a first centroid of the first plurality of sensors.

Figure 5A:
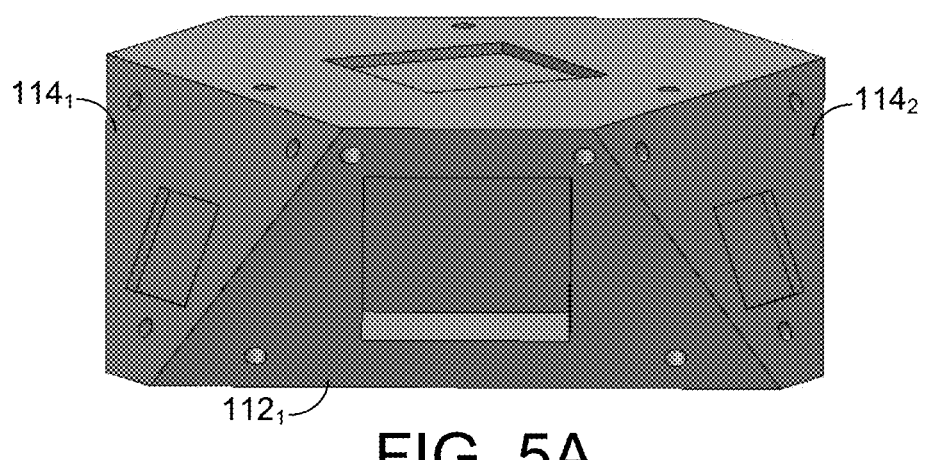
FIGS. 5A and 5B show perspective views of the double tetrahedron sensor cluster base of FIG. 3D without the mounted sensors according to an embodiment.
Figure 5B:
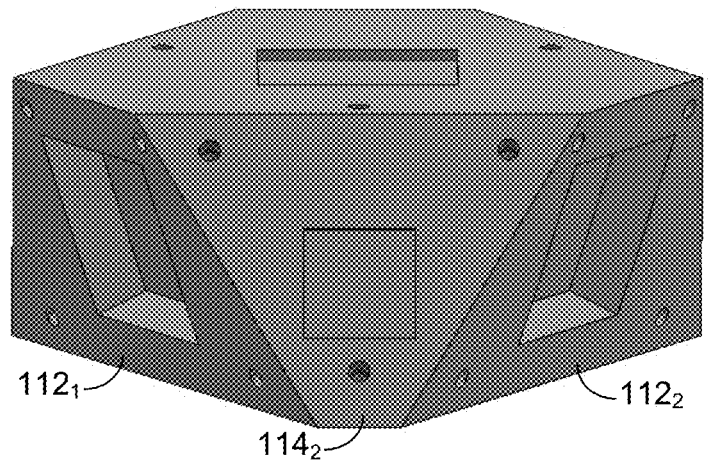
Figure 6:
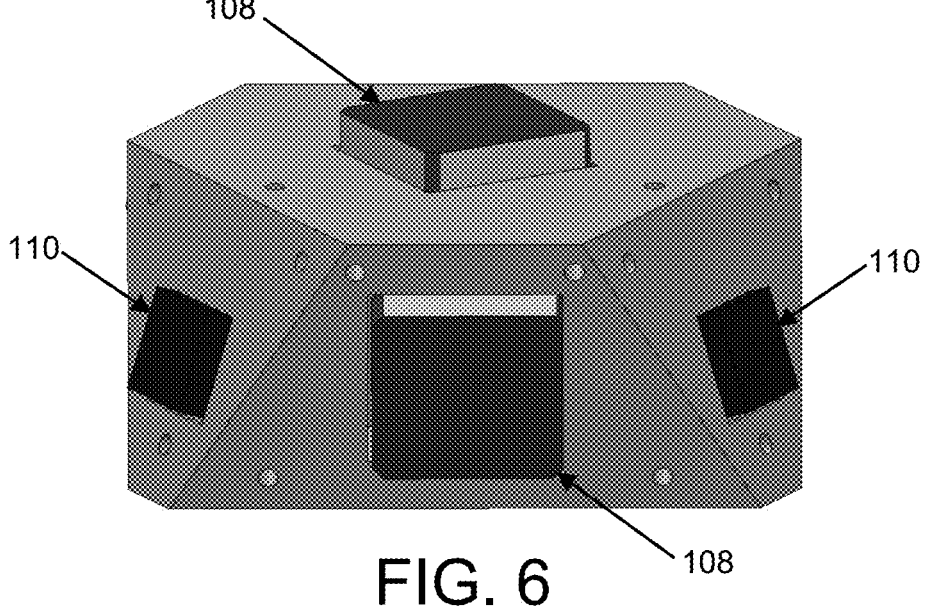
FIG. 6 shows a perspective view of the double tetrahedron sensor cluster base of FIG. 5A with the mounted sensors according to an embodiment.

FIGS. 5A and 5B show a perspective view of the double tetrahedron sensor cluster base of FIG. 3D without the sensors mounted on the surfaces (FIG. 5B is rotated left relative to FIG. 5A). These figures show that in this embodiment each of the first plurality of side surfaces (e.g., 112$_1$) are angled at a first angle from the bottom surface to the top surface of the sensor cluster base, and each of the second plurality of side surfaces (e.g., 114$_1$) is angled at a second angle from the bottom surface to the top surface, wherein the second angle is different from the first angle. FIG. 6 shows a perspective view of the double tetrahedron sensor cluster base of FIG. 3D with the two sensor types 108 and 110 mounted on the respective surfaces, wherein the footprint of the first sensor type 108 is larger than the footprint of the second sensor type 110.

In one embodiment, mounting four sensors on a tetrahedron structure provides redundancy in the Cartesian space covered by the sensors. This redundancy means the sensor signal output by any one of the sensors may be generated by combining the outputs of the other three sensors. The redundancy may be exploited for any number of reasons, such as replacing the output of a defective sensor with a virtual sensor signal generated by combining the sensor signals output by the remaining three good sensors. In another embodiment, the virtual sensor signal may be used to calibrate at least one of the sensors, for example, to calibrate out a DC bias or calibrate a gain of each sensor.

Figure 7:
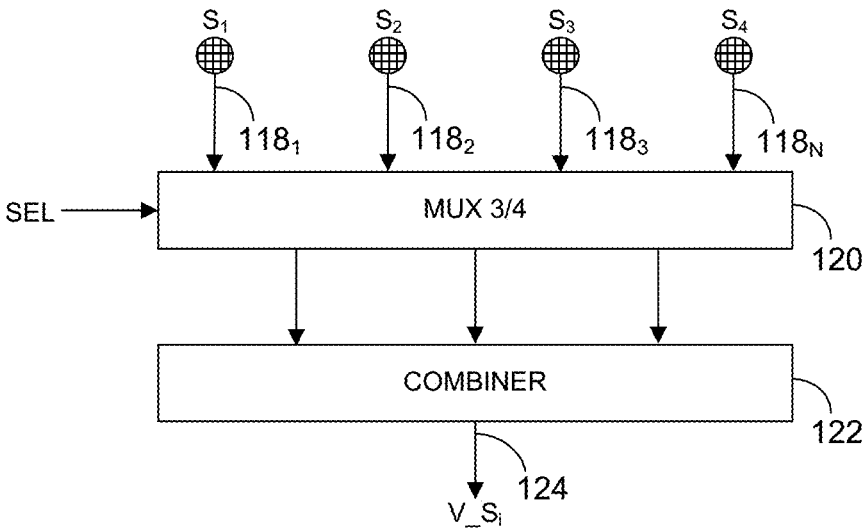
FIG. 7 shows an embodiment wherein a virtual signal is generated by processing three out of four real sensor signals.

FIG. 7 shows an example of this embodiment wherein a computer system is used to select three out of four of the sensor signals 118$_1$-118$_N$ using a multiplexer 120 (which may be implemented in software or hardware), followed by a combiner 122 (which may be implemented in software or hardware) for combining the three selected sensor signals to generate a virtual sensor signal V_Si 124. The combiner 122 may combine the three sensor signals using any suitable signal processing technique, such as simply adding the three sensor signals, to generate the virtual sensor signal V_Si 124.

Figure 8:
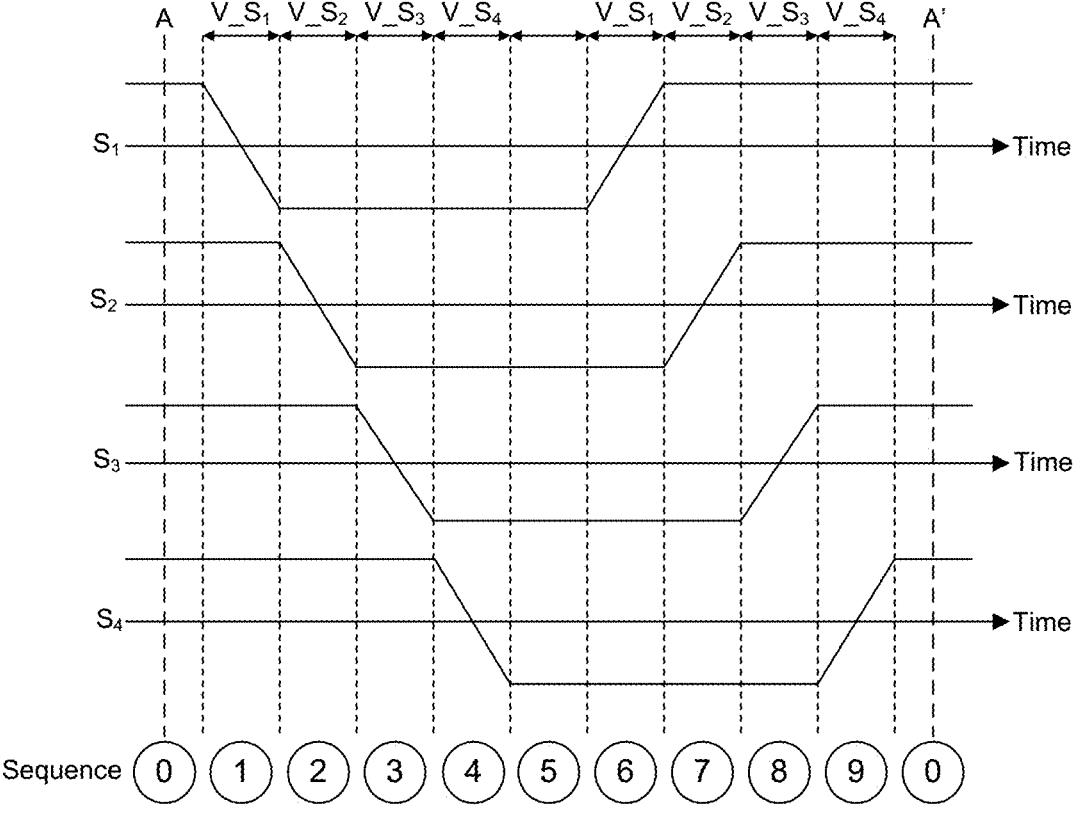
FIG. 8 shows an embodiment wherein the virtual sensor signal is used to calibrate out a DC bias of at least one sensor in the sensor cluster.

FIG. 8 shows an embodiment wherein the virtual sensor signal V_Si 124 is used to calibrate out a DC bias of each of the sensors. The procedure for calibrating out the DC bias for a cluster of sensors involves switching a polarity of a gain of each sensor at a predetermined interval and over a predetermined sequence during normal operation of the sensor cluster. In this manner, any DC bias exhibited by any one of the sensors is calibrated out over time by effectively adding the positive DC bias to the negative DC bias. This process for calibrating out a DC bias is generally known as Input Axis Reversal (IAR). However, a problem arises with conventional IAR in that during the interval when the gain polarity of one of the sensors is switching (e.g., when switching the gain polarity for sensor S$_1$ from positive to negative during sequence 1 of FIG. 8), the corresponding sensor signal output by the sensor is distorted which may adversely affect the normal operation of the sensor cluster. Accordingly in the embodiment of FIG. 8, during the interval when the gain of the respective sensor is switching polarity, the computer system that processes the sensor signals of the sensor cluster processes the virtual sensor signal V_Si 124 in place of the output of the respective sensor (e.g., when switching the gain polarity for sensor S$_1$ from positive to negative during sequence 1 of FIG. 8 the computer system processes V_S$_1$). In this manner the distortion caused by switching the gain polarity of each sensor during the IAR procedure does not adversely affect the normal operation of the sensor cluster.

Figure 9:
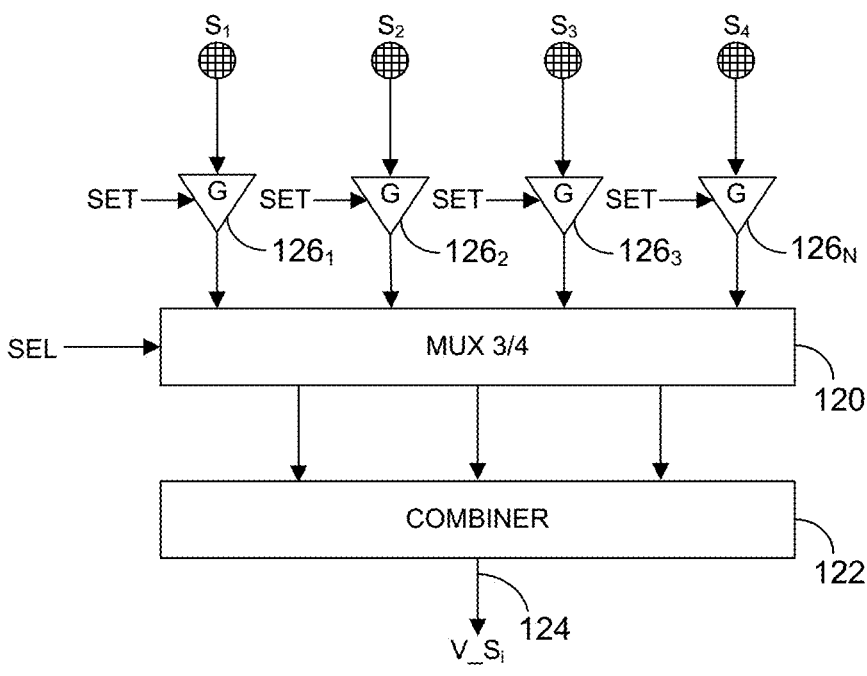
FIG. 9 shows an embodiment wherein the virtual sensor signal is used to calibrate a gain of at least one sensor in the sensor cluster.
Figure 10:
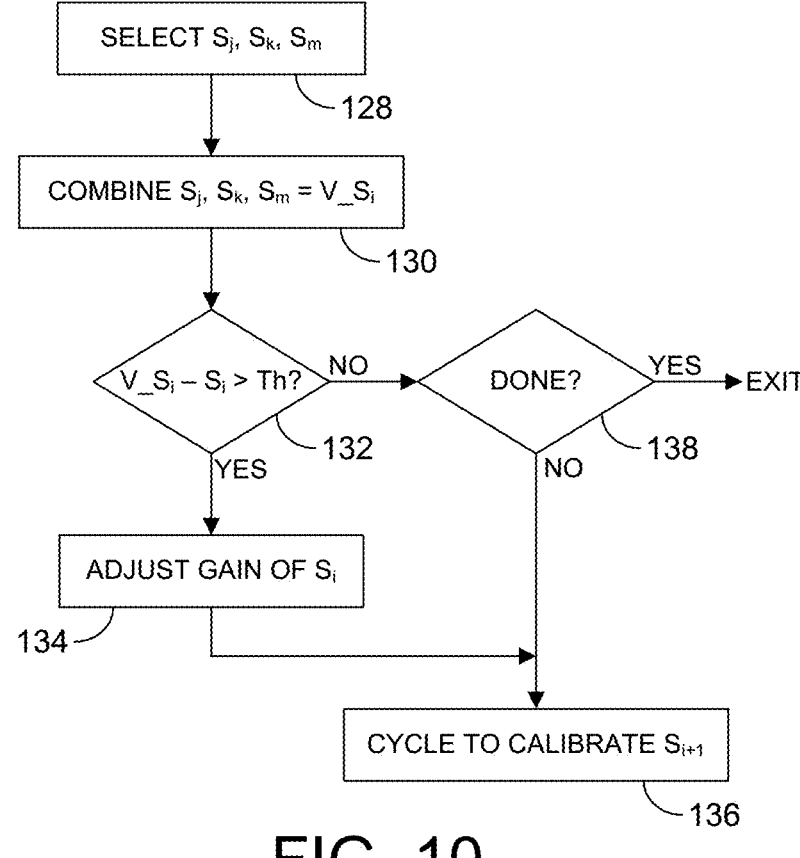
FIG. 10 is a flow diagram according to an embodiment wherein the gains of the real sensors are adjusted in a loop until the sensor signal output of each calibrated sensor substantially matches the corresponding virtual sensor signal.

FIG. 9 shows an embodiment wherein a gain 126$_1$-126$_N$ of at least one of the sensors is calibrated based on the virtual sensor signal V_Si 124. For example, in one embodiment the sensor signal output by a selected one of the sensors is compared to the corresponding virtual sensor signal V_Si 124, and the gain adjusted until the error between the two signals falls below a threshold. FIG. 10 is a flow diagram according to this embodiment wherein at block 128 the sensor signal output by three of the four sensors are selected and combined at block 130 to generate the virtual sensor signal V_Si. The virtual sensor signal V_Si is compared to the sensor signal output by the unselected sensor Si to generate an error that is compared to a threshold at block 132. If the error exceeds the threshold at block 132, the gain of the unselected sensor Si is adjusted at block 134 by a positive/negative delta that will result in a substantially zero error for that sensor Si. At block 136 the process cycles to calibrate the gain of the next sensor S$_{i+1}$ and the flow diagram is repeated from block 128. In one embodiment, adjusting the gain of one of the sensors at block 134 affects the virtual sensor signal generated for another of the sensors. Accordingly in one embodiment, the flow diagram of FIG. 10 is repeated until the error generated for each sensor falls below the threshold at block 132, at which point the flow diagram terminates at block 138.

In one embodiment, the gain of the sensors may drift over time and therefore may need to be recalibrated periodically. For example, in one embodiment the gain of one or more sensors may be adjusted during the interval corresponding to sequence 0 of FIG. 8 (i.e., during the interval when none of the sensors is switching gain polarity).

In one embodiment, the computer system may detect that one of the sensors is defective (or becomes defective over time), and therefore replace the sensor signal output by the defective sensor with the virtual sensor signal V_Si generated by combining the sensor signals output by the remaining, good sensors. Any suitable technique may be used by the computer system to detect a defective sensor, such as detecting a non-linear output of the sensor, a defective gain of the sensor, an unresponsive sensor when tested with a known stimulus, etc.

In one embodiment, the computer system in the above described embodiments comprises one or more processors configured to perform calculations, processes, operations, and/or functions associated with a program or algorithm. The processes and steps in the example embodiments may be instructions (e.g., software program) that reside within a non-transitory computer readable memory executed by the one or more processors of computer system. When executed, these instructions cause the computer system to perform specific actions and exhibit specific behavior for the example embodiments disclosed herein. The processors may include one or more of a single processor or a parallel processor, an application-specific integrated circuit (ASIC), programmable logic array (PLA), complex programmable logic device (CPLD), or a field programmable gate array (FPGA).

The computer system may be configured to utilize one or more data storage units such as a volatile memory unit (e.g., random access memory or RAM such as static RAM, dynamic RAM, etc.) coupled with address/data bus. Also, the computer system may include a non-volatile memory units (e.g., read-only memory ("ROM"), programmable ROM ("PROM"), erasable programmable ROM ("EPROM"), electrically erasable programmable ROM "EEPROM"), flash memory, etc.) coupled with an address/data bus. A non-volatile memory unit may be configured to store static information and instructions for a processor. Alternatively, the computer system may execute instructions retrieved from an online data storage unit such as in "Cloud" computing.

The computer system may include one or more interfaces configured to enable the computer system to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

The computer system may include an input device configured to communicate information and command selections to a processor. Input device may be an alphanumeric input device, such as a keyboard, that may include alphanumeric and/or function keys. The computer system may further include a cursor control device configured to communicate user input information and/or command selections to a processor. The cursor control device may be implemented using a device such as a mouse, a track-ball, a track-pad, an optical tracking device, or a touch screen. The cursor control device may be directed and/or activated via input from an input device, such as in response to the use of special keys and key sequence commands associated with the input device. Alternatively, the cursor control device may be configured to be directed or guided by voice commands.

The processes and steps for the example may be stored as computer-readable instructions on a compatible non-transitory computer-readable medium of a computer program product. Computer-readable instructions include a set of operations to be performed on a computer, and may represent pieces of a whole program or individual, separable, software modules. For example, computer-readable instructions include computer program code (source or object code) and "hard-coded" electronics (i.e. computer operations coded into a computer chip). The computer-readable instructions may be stored on any non-transitory computer-readable medium, such as in the memory of a computer or on external storage devices. The instructions are encoded on a non-transitory computer-readable medium.

A number of example embodiments have been described. Nevertheless, it will be understood that various modifications may be made without departing from the spirit and scope of the devices and methods described herein.

What is claimed is:

1. A computer system comprising:
N real sensors for outputting N real sensor signals;
a computer implemented multiplexer for selecting M of the real sensor signals from the N of real sensor signals, where M is less than N; and
a computer implemented combiner for combining the M real sensor signals to generate a virtual sensor signal representing an output of one of the unselected real sensors; wherein
the computer system is configured to calibrate at least one of the real sensors based on the virtual sensor signal; and
the computer system is configured to calibrate out a DC bias of the at least one of the real sensors based on the virtual sensor signal by:
switching a polarity of a gain of each of the real sensors at a predetermined interval and over a predetermined sequence; and
processing the virtual sensor signal in place of the output of a selected one of the real sensors during the interval when the gain of the selected real sensor is switching polarity.

2. A computer system comprising:
N real sensors for outputting N real sensor signals;
a computer implemented combiner for combining M of the real sensor signals to generate a virtual sensor signal, where M is less than N; and
a computer implemented calibration module configured to calibrate at least one of the real sensors based on the virtual sensor signal; wherein
the computer system is configured to use the virtual sensor signal to calibrate a gain of one of the real sensors not used to generate the virtual sensor signal.

3. A computer system comprising:
N real sensors for outputting N real sensor signals;
a computer implemented multiplexer for selecting M of the real sensor signals from the N of real sensor signals, where M is less than N; and
a computer implemented combiner for combining the M real sensor signals to generate a virtual sensor signal representing an output of one of the unselected real sensors; wherein
the computer system is configured to calibrate at least one of the real sensors based on the virtual sensor signal; and
the computer system is configured to calibrate a gain of the at least one of the real sensors based on the virtual sensor signal.

4. The computer system as recited in claim 3, wherein the computer system is configured to use the virtual sensor signal in place of the output of the unselected real sensor when the unselected real sensor is defective.

5. The computer system as recited in claim 3, wherein the computer system is configured to calibrate out a DC bias of the at least one of the real sensors based on the virtual sensor signal.

6. The computer system as recited in claim 3, wherein the computer system is configured to calibrate the gain of the at least one of the real sensors by comparing the output of the real sensor to the virtual sensor signal.

7. The computer system as recited in claim 2, wherein the virtual sensor signal represents the output of one of the real sensors not used to generate the virtual sensor signal.

8. The computer system as recited in claim 2, wherein the computer system is configured to calibrate the gain of the one of the real sensors not used to generate the virtual sensor signal by comparing the output of the real sensor to the virtual sensor signal.

9. The computer system as recited in claim 2, wherein the computer system is configured to calibrate out a DC bias of the at least one of the real sensors based on the virtual sensor signal.

10. A computer system comprising:

N real sensors for outputting N real sensor signals;

a computer implemented combiner for combining M of the real sensor signals to generate a virtual sensor signal, where M is less than N; and a computer implemented calibration module configured to calibrate at least one of the real sensors based on the virtual sensor signal; wherein the computer system is configured to calibrate out a DC bias of the at least one of the real sensors based on the virtual sensor signal by:

switching a polarity of a gain of each of the real sensors at a predetermined interval and over a predetermined sequence; and processing the virtual sensor signal in place of the output of a selected one of the real sensors during the interval when the gain of the selected real sensor is switching polarity.

11. The computer system as recited in claim 10, wherein the computer system is configured to use the virtual sensor signal to calibrate one of the real sensors not used to generate the virtual sensor signal.

12. A computer implemented method of generating a virtual sensor signal to replace a defective real sensor, the method comprising:

using a computer to detect the defective real sensor; and using the computer to combine a plurality of real sensor signals output by a plurality of respective working real sensors to generate a virtual sensor signal representing an output of the defective real sensor; wherein the defective real sensor and the plurality of working real sensors are configured into a geometric configuration resulting in a redundancy that enables the virtual sensor signal to represent the output of the defective real sensor; and the geometric configuration comprises a plurality of surfaces of an N-hedron structure, wherein the working real sensors and the defective real sensor are mounted on at least some of the surfaces of the plurality of surfaces of the N-hedron structure.

13. The method as recited in claim 12, wherein combining the plurality of real sensor signals comprises adding the real sensor signals.

* * * * *